United States Patent [19]
Grace et al.

[11] Patent Number: 6,087,995
[45] Date of Patent: Jul. 11, 2000

[54] UNIVERSAL AUTORADAR ANTENNA ALIGNMENT SYSTEM

[75] Inventors: Martin I. Grace, San Jose; Donald A. Bradley, Morgan Hill, both of Calif.

[73] Assignee: Anritsu Company, Morgan Hill, Calif.

[21] Appl. No.: 09/252,492

[22] Filed: Feb. 17, 1999

[51] Int. Cl.$^7$ .................................................... H01Q 1/32
[52] U.S. Cl. ..................... 343/703; 343/713; 340/903; 342/174
[58] Field of Search ................................. 343/713, 703; 340/903; 356/385; 342/174

[56] References Cited

U.S. PATENT DOCUMENTS

| | | | |
|---|---|---|---|
| 4,041,494 | 8/1977 | Ewen et al. | 343/112 D |
| 5,111,210 | 5/1992 | Morse | 342/455 |
| 5,314,037 | 5/1994 | Shaw et al. | 340/903 |
| 5,646,612 | 7/1997 | Byon | 340/903 |
| 5,977,906 | 11/1999 | Ameen et al. | 342/174 |

*Primary Examiner*—Hoanganh Le
*Assistant Examiner*—Hoang Nguyen
*Attorney, Agent, or Firm*—Fliesler, Dubb, Meyer & Lovejoy

[57] ABSTRACT

An automobile collision avoidance radar antenna alignment system includes a first interferometer (506) with antennas (501) and (503) for alignment along an azimuth (x) axis of the collision avoidance radar antenna, and a second interferometer (508) with antennas (502) and (504) for alignment along an elevation (y) axis of the collision avoidance radar. Difference azimuth ($\Delta_{AZ}$) and difference elevation ($\Delta_{EL}$) outputs of the interferometers (506) and (508) are added ($\Delta_T = \Delta_{AZ} + \Delta_{EL}$) with the amplitude of ($\Delta_T$) provided at a power detector (526). Sum azimuth ($\Sigma_{AZ}$) and sum elevation ($\Sigma_{AZ}$) are added ($\Sigma_T = \Sigma_{AZ} + \Sigma_{EL}$) with the amplitude of ($\Sigma_T$) provided to a power detector (547). To align a collision avoidance radar antenna, the antennas of the antenna alignment system are positioned with a centerline parallel to the thrust vector of the automobile using a laser beam fixture 204. Azimuth and elevation translation errors ($\Delta x$) and ($\Delta y$) between antennas of the antenna alignment system and the antenna of the collision avoidance radar are removed by moving the antenna alignment system until the total difference signal ($\Delta_T$) is a minimum. The angle ($\alpha$) between the boresite of the collision avoidance radar antenna and the thrust vector of the automobile is set to zero by adjusting the collision avoidance radar antenna until the total sum signal ($\Sigma_T$) is a maximum.

17 Claims, 4 Drawing Sheets

UNIVERSAL AUTORADAR ANTENNA ALIGNMENT SYSTEM

BACKGROUND OF THE INVENTION

1. Field of the Invention

The present invention relates to a test system used to align the boresite of a radar antenna. More particularly, the present invention relates to a test system to align the boresite of a collision avoidance radar system antenna with the thrust vector of an automobile.

2. Description of the Related Art

Recently, manufacturers have begun producing collision avoidance radar systems for automobiles. Such systems have been used in combination with a vehicle cruise control to form an automotive Adaptive Cruise Control (ACC) radar system. An ACC radar system transmits a signal from an antenna typically located in the grill area of an automobile. The ACC radar then determines from a return signal received by the radar antenna a distance an object causing the return signal is located from the automobile. If an object is detected in the path of the vehicle, wheel braking or engine deceleration is applied by the ACC radar system to maintain a desired distance from the object and to prevent the vehicle from striking the object.

To assure proper performance of an ACC radar system, the device must be regularly tested. During testing, proper alignment of the ACC radar antenna boresite with a thrust vector of the vehicle is assured. The vehicle thrust vector is typically identified along the forward direction of travel of a vehicle. To align the boresite of the ACC radar antenna, for FM-CW and Pulse modulated radar systems a Doppler shifted signal is not generally required for the radar, so a passive trihedral target reflector is typically used for testing and mechanically aligned at a point in space along the vehicle thrust vector. With the trihedral target so aligned, the position and orientation of the antenna are set to maximize the energy reflected back to the ACC radar from the trihedral target. Frequency shift keying (FSK) modulated radars require a Doppler shift in order for the radar to respond. To align the FSK radar along the vehicle thrust vector, either the vehicle must be moving relative to a trihedral target, or the target moving, and the antenna aligned to maximize reflected energy.

Also to assure proper performance, verification testing is performed to determine if the ACC radar system is making proper calculations of distance to an object creating a return signal.

SUMMARY OF THE INVENTION

In accordance with the present invention, a Radar Test System (RTS) receiver is provided with components used to align the ACC radar antenna centerline to be parallel with the thrust vector of the vehicle. In addition, the RTS can verify the performance of the ACC radar by simulating a target radar return at an accurate distance and target velocity.

The RTS in accordance with the present invention includes a first interferometer with a pair of antennas for alignment along the azimuth or x-axis of the ACC radar antenna, and a second interferometer with a pair of antennas for alignment along the elevation or y-axis of the ACC radar antenna. Difference azimuth ($\Delta_{AZ}$) and difference elevation ($\Delta_{EL}$) outputs of the interferometers are added to form a difference total signal ($\Delta_T = \Delta_{AZ} + \Delta_{EL}$). Sum azimuth ($\Sigma_{AZ}$) and sum elevation ($\Sigma_{AZ}$) signals are added to form a sum total signal ($\Sigma_T = \Sigma_{AZ} + \Sigma_{EL}$). The difference total signal ($\Delta_T$) is downconverted and provided to a power detector which provides a difference total amplitude output for the RTS. The sum total signal ($\Sigma_T$), likewise is downconverted to form an IF signal and provided to a power detector which provides a sum total amplitude output for the RTS.

To test an ACC radar with the RTS according to the present invention, the RTS is positioned along the thrust vector of an automobile containing the ACC radar. The RTS can be positioned along the thrust vector using a laser beam aligned perpendicular to a wheel axis. The laser beam is aligned when transmitted through a narrow slot in an RTS alignment fixture attached to the RTS.

To further align the RTS with the centerline of the ACC radar antenna, azimuth and elevation translation errors ($\Delta x$) and ($\Delta y$) between the RTS antennas and the ACC radar antenna are removed by moving the RTS in the x and y-axis until the total difference signal ($\Delta_T$) is a minimum. The angle ($\alpha$) between the boresite of the collision avoidance radar antenna and the thrust vector of the automobile is then set to zero by adjusting the ACC radar antenna position until the total sum signal ($\Sigma_T$) is a maximum.

The sum IF signal provided to a power detector can be provided through either a through line or a bulk acoustic wave (BAW) delay device and then upconverted for retransmission to the ACC radar. Such upconversion enables the RTS to function as a transponder and to simulate a target spaced a desired distance from the ACC radar. A Doppler offset can be provided during upconversion of the sum IF signal to simulate a target moving at a desired rate of speed relative to the ACC radar and to enable the RTS to function as a transponder for a FSK modulated ACC radar system.

BRIEF DESCRIPTION OF THE DRAWINGS

Further details of the present invention are explained with the help of the attached drawings in which.

DETAILED DESCRIPTION

Figure 1:
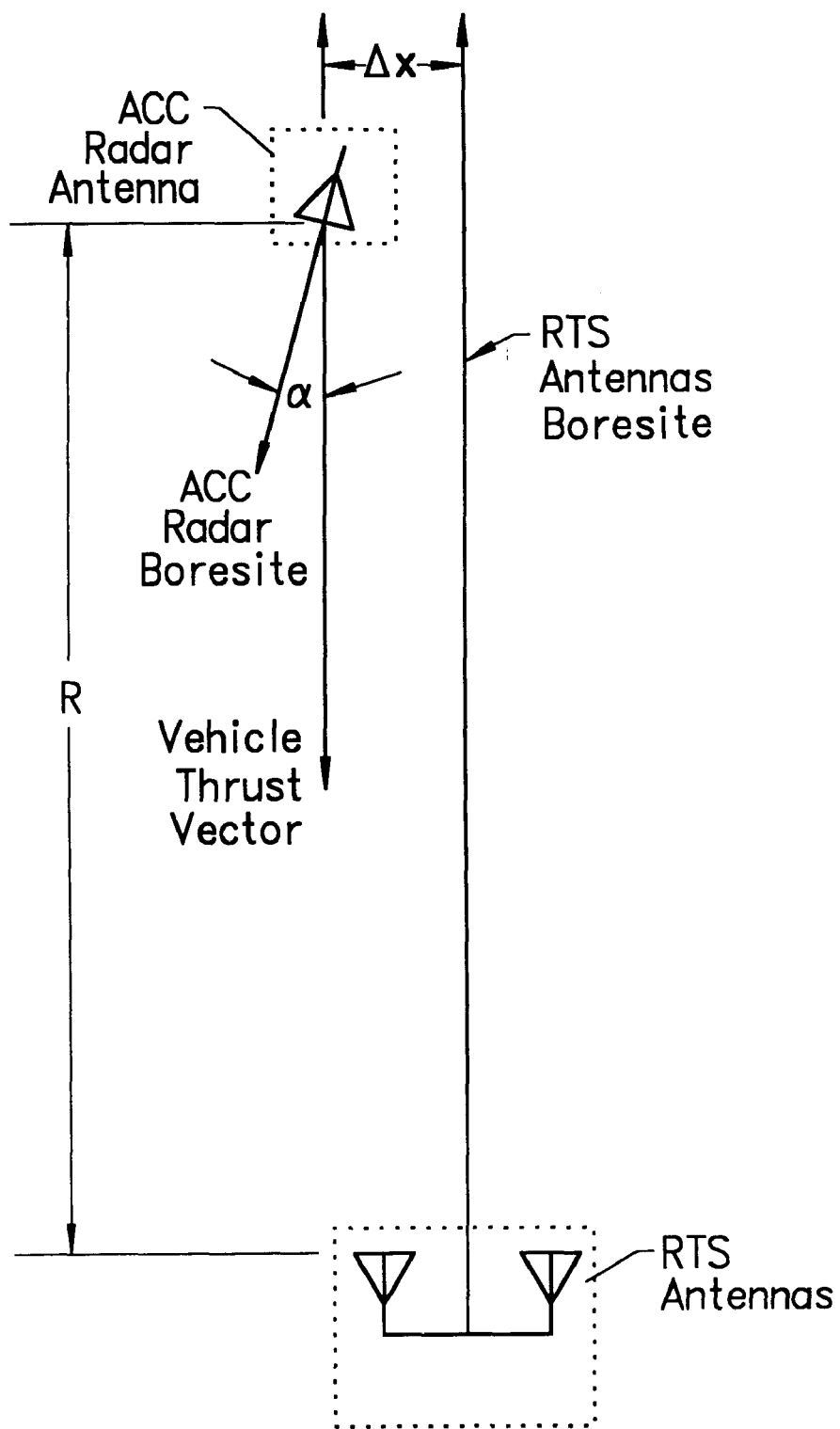
FIG. 1 illustrates boresite alignment discrepancies of an ACC radar antenna relative to the thrust vector of an automobile and translation offset of the ACC radar antenna relative to RTS antennas.

Installation of the ACC radar antenna on the vehicle can lead to improper antenna alignment due to mechanical translation and electrical boresite alignment discrepancies. The boresite angle $\alpha$ between an ACC radar antenna boresite and a vehicle thrust vector is illustrated in FIG. 1. FIG. 1 also illustrates a translation offset Ax between the ACC radar antenna boresite and the boresite of RTS antenna aligned with an x-axis. Translation offsets are defined as mechanical deviations $\Delta x$ and $\Delta y$ from the projection of the vehicle thrust vector upon a perpendicular plane at a distance R from a boresite for the RTS antennas. The angular transmit boresite error $\alpha$ is the angle formed between the ACC radar boresite and the thrust vector.

The radar transmitter antenna is broadcast over a narrow beam width. For example, a typical ACC radar 3 dB beam width is less than 5 degrees. The ACC radar is considered to be properly aligned when the offset distances Δx and Δy and angle α are all zero.

Figure 2:
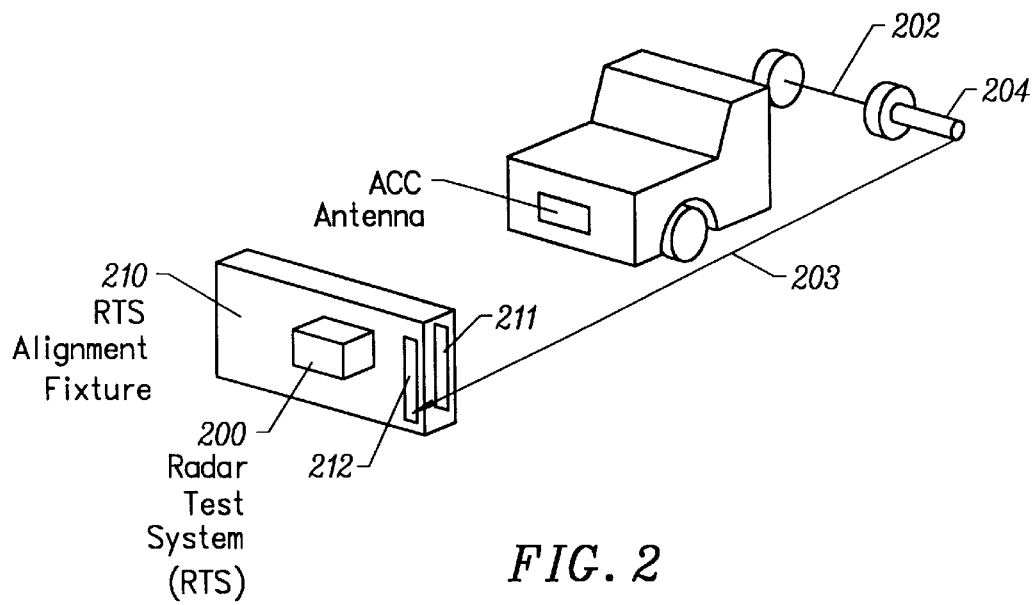
FIG. 2 illustrates alignment of RTS antennas with the thrust vector of an automobile.

FIG. 2 illustrates alignment of the RTS with the thrust vector of an automobile. The vehicle thrust vector is defined as a vector in the x-y plane that is perpendicular to a wheel axis of a vehicle. A vehicle thrust vector can be identified as perpendicular to the rear wheel axle 202 of the vehicle using a laser beam positioning fixture 204. The laser beam positioning fixture 204 is attached to the vehicle axle 202 and transmits a laser beam 203 which is aligned by the fixture to be perpendicular to the rear axle 202. The fixture 204 can be a device commonly used for wheel alignment. The RTS 200 is attached to an alignment fixture 210, and when the RTS 200 is aligned with its antenna centerline parallel with the vehicle thrust vector, the laser beam will be transmitted through a narrow slot 211 in the RTS alignment fixture 210 and will impinge upon a thin reflective stripe 212 on the back wall of the fixture 210. An operator when observing the laser beam on the reflective stripe 212 can determine when the RTS is aligned with the vehicle thrust vector. The reflective stripe 212 can be replaced by a mirror and a sensor can be used in the fixture 204 to indicate when the RTS is aligned with the vehicle thrust vector. Also, the portion of the alignment fixture 210 containing the slot 211 can be disconnected from the portion containing the reflective stripe 212 within the scope of the present invention.

Figure 3:
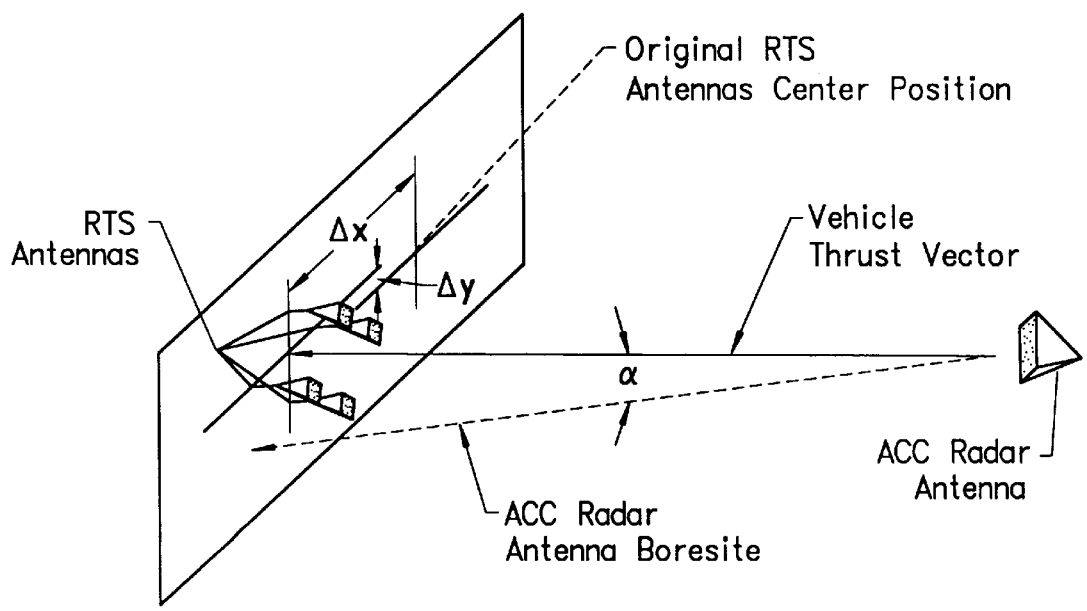
FIG. 3 illustrates movement of RTS antennas relative to an ACC radar antenna to remove translation errors.

After alignment of the RTS with a vehicle thrust vector, the RTS antennas are further aligned with a centerline of the ACC antenna to remove any translation offset as illustrated in FIG. 3. To remove the translation offset, the RTS antennas are translated mechanically from an original antenna center position to a point where translation offsets Δx and Δy are set to zero as indicated using interferometers located in the RTS system. The point where Δx and Δy are at zero is identified by a boresite null as described in more detail to follow.

Figure 4A:
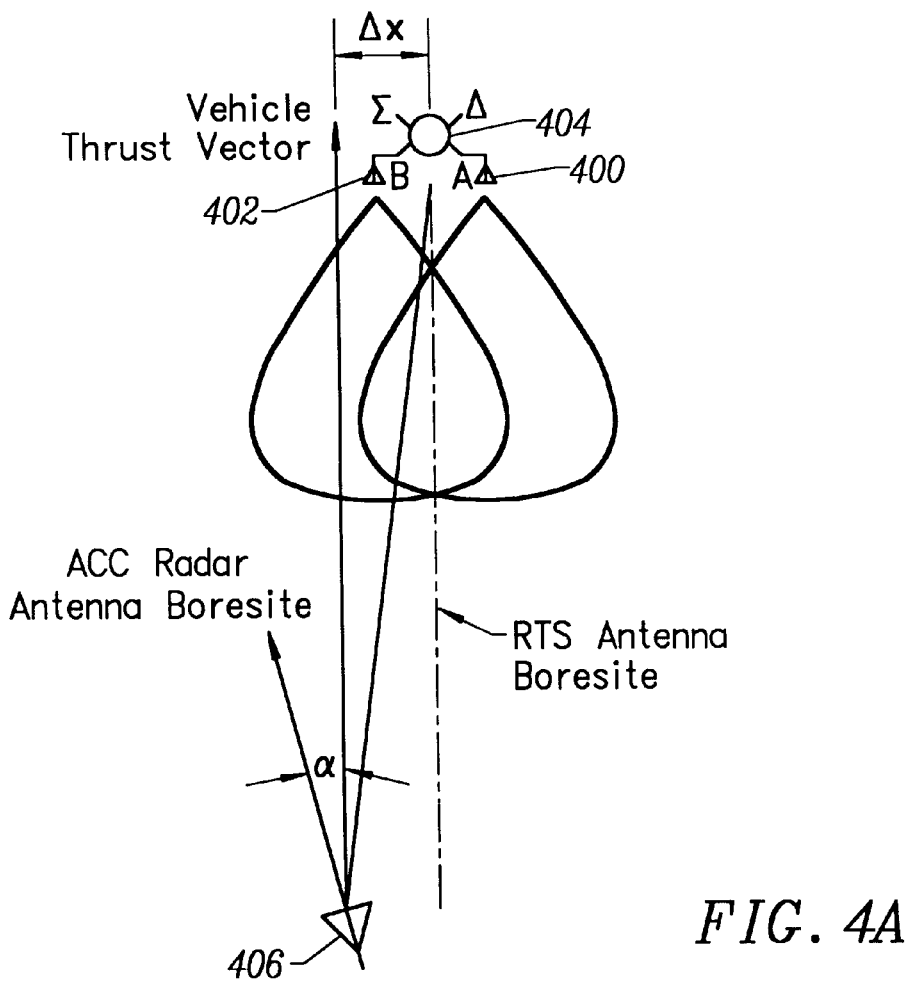
FIG. 4A illustrates signals received by RTS antennas as connected to an interferometer.
Figure 4B:
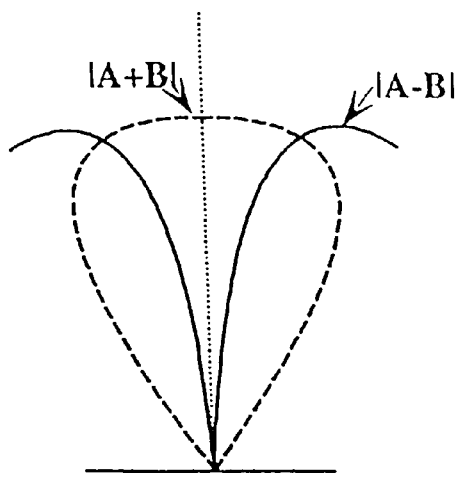
FIG. 4B shows sum and difference output patterns for the interferometer of FIG. 4A.

The RTS uses an internal interferometer monopulse receiver to set the translation offsets Δx and Δy to zero. The monopulse receiver operates using a first interferometer 404 connected to the RTS antennas 400 and 402 aligned with the azimuth axis as illustrated in FIG. 4A. A signal transmitted by the ACC radar antenna 406 and received by the antennas 400 and 402 generates an output A from antenna 400 and an output B from antenna 402. The outputs of antennas 400 and 402 are summed |A+B| to form a sum vector (Σ). The sum vector (Σ) has a typical voltage amplitude pattern as the ACC radar antenna is moved along the x-axis as illustrated in FIG. 4B. The difference between the outputs of the antennas 400 and 402 |A−B| forms a difference vector (Δ). The difference vector (Δ) has a typical voltage amplitude pattern as the ACC radar antenna is moved along the x-axis as illustrated in FIG. 4B. A null in the signal detected in the (Δ) difference channel is obtained when the translation offset Δx along the azimuth is set to zero. Two additional RTS antennas aligned with the elevation axis can be connected to an additional interferometer (not shown in FIG. 4A). The translation offset Δy is set to zero by moving the ACC radar antenna until a signal obtained in a difference channel from the additional interferometer is nulled. Translation errors are, thus, removed by roughly aligning the boresite of the RTS along the thrust vector by mechanically positioning the RTS to give a null in the azimuth (Δx=0) and elevation (Δy=0).

After the translation offsets Δx and Δy are removed, only when a signal from an ACC Radar is directly along the boresite of the RTS monopulse receiver will there be equal signals at two opposing interferometer antennas. In other words, the signal energy that is transmitted from the ACC radar to the RTS receiver is a maximum when the offset angle α=0. The boresite angle α is, thus, be set to zero using the sum channel (Σ) of the monopulse receiver.

Setting the boresite angle α to zero is accomplished by adjusting the ACC antenna position to maximize the energy detected in the sum channel (Σ) of the RTS monopulse receiver. In other words, the ACC radar antenna angle projection is adjusted in the x and y planes until the received sum signal (Σ) from the RTS interferometers fro the azimuth and elevation RTS antennas. Such a method for boresite alignment is based upon the assumption that the boresite angle α for the ACC radar is the same for both transmit and receive.

Figure 5:
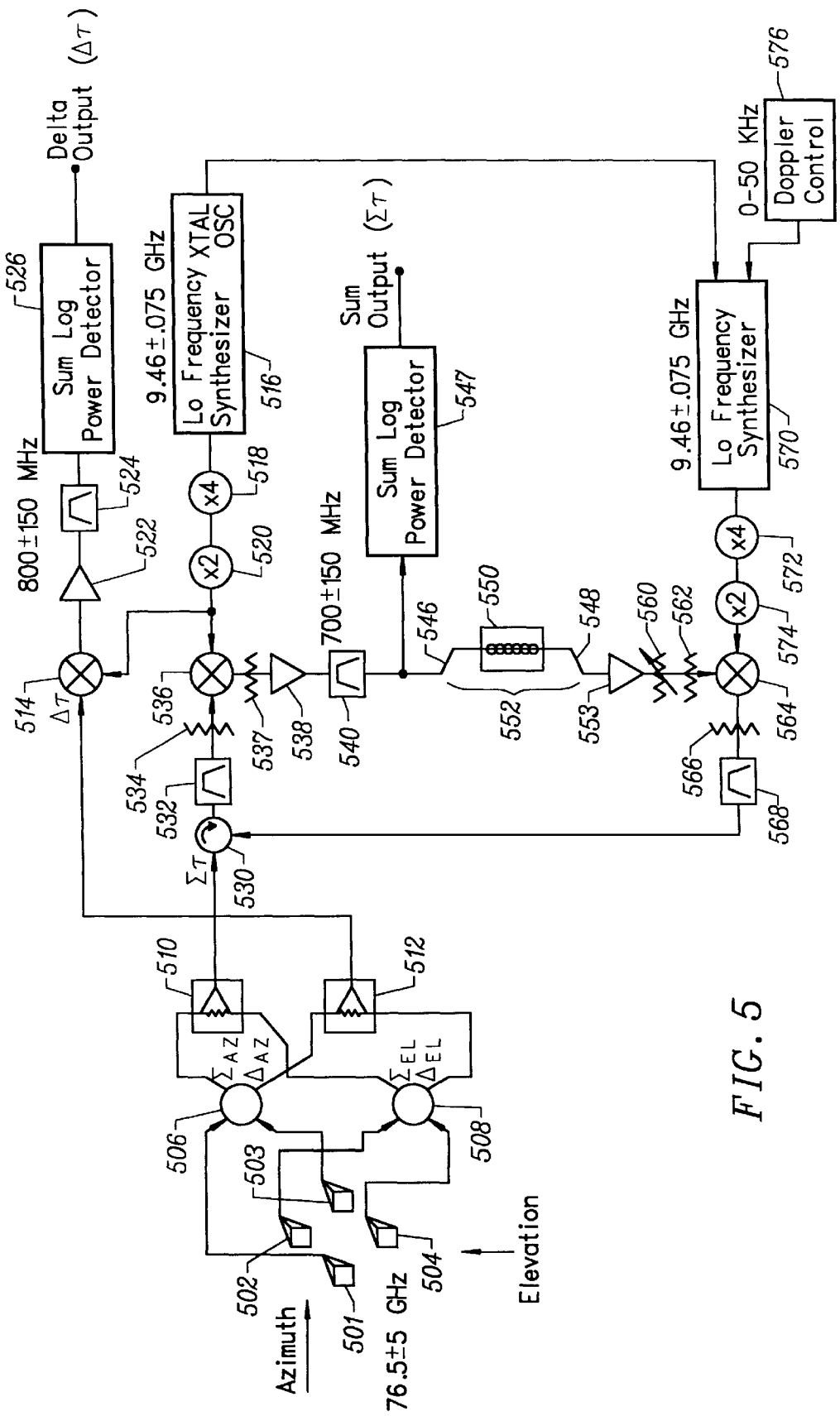
FIG. 5 shows components of an RTS according to the present invention.

A block diagram for the RTS Monopulse receiver is shown in FIG. 5. The RTS antennas aligned with the azimuth are the antennas 501 and 503, while the RTS antennas aligned with the elevation are the antennas 502 and 504. The antennas can be designed to receive signals within a typical ACC radar range of 76.5±0.5 GHz to cover the full 76–77 GHz frequency range allocated by the Federal Communications Commission (FCC) for ACC radar systems used in the united states. A typical ACC radar spreads the spectrum of the radar signal over as much as 250 or more MHZ with a center frequency near 76.5 GHz. A given ACC radar system may operate over any portion of the 76–77 GHz frequency band assigned by the FCC.

Outputs from the azimuth antennas 501 and 503 are provided to inputs of an interferometer 506, while outputs of the elevation antennas 502 and 504 are provided to inputs of an interferometer 508. Outputs of the interferometer 506, thus, provide a sum azimuth signal ($\Sigma_{AZ}$) and a difference azimuth signal ($\Delta_{AZ}$). Outputs of the interferometer 508 provide a sum elevation signal ($\Sigma_{EL}$) and a difference elevation signal ($\Delta_{EL}$). The sum azimuth ($\Sigma_{AZ}$) and sum elevation ($\Sigma_{EL}$) signals are added in the hybrid 510 to form a total sum signal $\Sigma_T=\Sigma_{AZ}+\Sigma_{EL}$. The difference azimuth ($\Delta_{AZ}$) and difference elevation ($\Delta_{EL}$) signals are added in the hybrid 512 to form a total difference signal $\Delta_T=\Delta_{AZ}+\Delta_{EL}$.

The total difference signal ($\Delta_T$) is provided to the first input of a harmonic downconverter 514 while a second input of the harmonic downconverter 514 is provided from a local oscillator (LO) synthesizer 516 through ×4 multiplier 518 and ×2 multiplier 520. The LO synthesizer 516 can be controlled to provide a signal with a desired frequency range, such within the 9.46±0.075 GHz range indicated. The output of the downconverter 514 then provides an IF signal through an amplifier 522 and bandpass filter 524 to a sum log power detector 526. The bandpass filter is designed to operate over the desired IF bandwidth and eliminate noise outside the IF bandwidth. A representative IF bandwidth for the filter 524 is shown as 800±150 MHZ. The sum log power detector 526 provides a voltage signal indicative of the delta total output ($\Delta_T$) which can be connected to a display for reading by an operator. By moving the RTS antennas relative to the ACC radar antennas, and observing the delta output ($\Delta_T$) until a minimum is obtained, an operator can remove elevation and azimuth translation errors.

The total sum signal ($\Sigma_T$) is provided to one terminal of a circulator 530. A second terminal of the circulator (530) provides the signal ($\Sigma_T$) through a bandpass filter 532 and attenuator pad 534 to a first input of a harmonic downconverter 536. The bandpass filter 532 serves to limit noise outside the desired 76–77 GHz region of the signal ($\Sigma_T$). A second input of the downconverter 536 is provided from the LO synthesizer 516 through the ×4 multiplier 518 and ×2 multiplier 520. The output of the downconverter 536 then provides an IF signal through an attenuator pad 537, amplifier 538 and bandpass filter 540 to a sum log power detector 547. The bandpass filter 540 is designed to operate over the desired IF bandwidth and eliminate noise outside the IF bandwidth. A representative IF bandwidth for the filter 540 is shown as 700±150 MHZ. The sum log power detector provides a voltage signal indicative of the sum total output ($\Sigma_T$) which can be connected to a display for reading by an operator. By moving the ACC radar antenna boresite along the azimuth axis and elevation axis, and observing the sum output ($\Sigma_T$) until a maximum is obtained, an operator can remove elevation and azimuth translation errors.

The IF signal provided to the log sum power detector 547 is also provided to a pair of switches 546 and 548. The switches 546 and 548 are controlled to connect either a BAW delay line 550 or a through line 552 from the log sum power detector 547 input to the input of an amplifier 553. The output of amplifier 553 is provided through a radar cross section (RCS) control attenuator 560 and pad 562 to a first input of a harmonic upconverter 564. The output of upconverter 564 is then provided for retransmission as described in more detail to follow.

To simulate the delay and amplitude of a target with the specified radar cross section (RCS) at a range of 7 meters, the thru line 552 is connected between the switches 546 and 548. The 7 meters distance is created by separating the RTS antennas and the ACC radar antenna by approximately 7 meters to satisfy the Fraunhofer conditions. The amplitude of the signal from the through line can be controlled by RCS control attenuator 560 so that a signal retransmitted by the RTS simulates a return from a target having the specified RCS spaced 7 meters from the ACC antenna.

To simulate the delay and amplitude of a target with a specified RCS at a range of approximately 120 meters or more, the BAW delay line 550 is connected between switches 546 and 548. The RCS control attenuator 560 can likewise be set to so that a retransmitted signal from the RTS simulates the amplitude of a signal reflected from a specified target at approximately 120 meters.

To provide upconversion, a second input of the upconverter 564 is received from a LO synthesizer 570 through a ×4 multiplier 572 and a ×2 multiplier 574. The LO synthesizers 516 and 570 are preferably high resolution frequency synthesizers, such as the 68A-Series or 68B-Series Synthesized Sources available from Anritsu Corporation, Morgan Hill Calif. Such commercial synthesizers can provide a 0.1 Hz resolution with isolation as low as −80 dB.

The LO synthesizers 516 and 570 are phase locked using a connection from the crystal oscillator of one device provided to the other. The LO synthesizer 570 can be controlled to provide an output with the same frequency as the output from LO synthesizer 516. Doppler offset control information to vary the output frequency of the LO synthesizer 570 from the LO synthesizer 516 can likewise be provided to enable Doppler shift simulation in a retransmitted signal from the RTS. A suggested frequency range for the LO synthesizer 570 is shown as 9.46±0.075 GHz, while a suggested 0–50 KHz Doppler offset range is likewise shown in FIG. 5.

The output of the upconverter 564 is provided through a pad 566 and bandpass filter 568 to a third terminal of the circulator 530. The bandpass filter 568 serves to eliminate undesirable harmonics from the upconverter 564 output. The circulator 530 then provides the upconverted signal back to the antennas 501–504 for retransmission. The upconverted signal as retransmitted enables the RTS to function as a transponder and to simulate a target spaced a desired distance from the ACC radar. A Doppler offset provided during upconversion allows simulation of a target moving at a desired rate of speed relative to the ACC radar, and further enables the RTS to function as a transponder for a FSK modulated ACC radar system.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method of aligning an antenna of a collision avoidance radar system installed in an automobile comprising the steps of:

removing translation errors between a pair of radar test system (RTS) antennas which receive a signal from the collision avoidance radar system and the antenna of the collision avoidance radar system by moving the pair of RTS antennas until an amplitude difference output of an interferometer receiving outputs of the pair of RTS antennas is substantially at a minimum; and adjusting a boresite position of the antenna of the collision avoidance radar system until a sum output of the interferometer is substantially at a maximum.

2. The method of claim 1, wherein the pair of RTS antennas are aligned along an azimuth axis of the antenna of the collision avoidance radar system.

3. The method of claim 2, wherein the step of positioning the RTS antennas comprises:

aligning a laser beam approximately perpendicular to an axle of the automobile;

moving the RTS and determining when light from the laser beam is reflected back from a reflective plate on an alignment fixture attached to the RTS.

4. The method of claim 3, wherein the laser beam is provided through a narrow slot in the alignment fixture to the reflective plate.

5. The method of claim 1, wherein the pair of RTS antennas are aligned along a horizontal axis of the antenna of the collision avoidance radar system.

6. The method of claim 1 further comprising the step of:

positioning the pair of RTS antennas so that a point between the pair of RTS antennas is approximately aligned with a thrust vector of the automobile prior to the step of removing translation errors.

7. A method of testing a collision avoidance radar system installed in an automobile comprising the steps of:

aligning a first pair of radar test system (RTS) antennas along an azimuth axis of a collision avoidance radar system with a center point between the first pair of antennas approximately aligned with a thrust vector of the automobile;

aligning a second pair of RTS antennas along a horizontal axis of the collision avoidance radar system;

removing translation errors between the first and second pair of RTS antennas and the collision avoidance radar system antenna by moving the first and second pair of RTS antennas until an amplitude difference output from a first interferometer receiving outputs of the first pair of RTS antennas combined with an amplitude difference output from a second interferometer receiving outputs of the second pair of RTS antennas is substantially at a maximum;

adjusting a boresite position of the antenna of the collision avoidance radar system until a sum output from the first interferometer combined with a sum output of the second interferometer are substantially at a maximum.

8. The method of claim 7 further comprising the steps of:

downconverting frequency of the sum output of the first interferometer combined with the sum output of the second interferometer to provide an intermediate frequency signal;

delaying the intermediate frequency signal;

upconverting frequency of the intermediate frequency signal to provide a conditioned signal; and transmitting the conditioned signal from the first and second pair of RTS antennas to the collision avoidance radar system.

9. The method of claim 8, wherein a Doppler shift is provided to the conditioned signal during the step of upconverting the frequency of the intermediate frequency signal.

10. An automobile collision avoidance radar antenna alignment system comprising:

a first pair of antennas;

a second pair of antennas;

a first interferometer having inputs receiving outputs from the first pair of antennas, and providing a sum output and a difference output;

a second interferometer having inputs receiving outputs from the second pair of antennas, and providing a sum output and a difference output;

a first hybrid combiner having a first input receiving the sum output of the first interferometer, a second input receiving the sum output of the second interferometer, and providing an output;

a second hybrid combiner having a first input receiving the difference output of the first interferometer, a second input receiving the difference output of the second interferometer, and providing an output;

a first local oscillator;

a first downconverter having a first input coupled to the output of the second hybrid combiner, a second input coupled to the first local oscillator, and having an output;

a first power detector having an input coupled to the output of the first downconverter, the first power detector for providing a signal indicating a sum of the difference output from the first interferometer and the difference output from the second interferometer;

a second downconverter having a first input coupled to the output of the first hybrid combiner, a second input coupled to the first local oscillator, and having an output; and a second power detector having an input coupled to the output of the second downconverter, the second power detector for providing a signal indicating a sum of the sum output from the first interferometer and the sum output from the second interferometer.

11. The system of claim 10, further comprising:

switches for selectively coupling one of at least two delay elements from the output of the second down converter to the to a first node;

a second local oscillator; and an upconverter having a first input coupled to the first node, a second output coupled to the second local oscillator, and an output coupled to the first pair of antennas and the second pair of antennas.

12. The system of claim 11, wherein one of the delay elements comprises a bulk acoustic wave delay line.

13. The system of claim 11, wherein one of the delay elements comprises a through line.

14. The system of claim 11, wherein the first and second local oscillators are phase locked, and the second local oscillator is controlled to have a frequency offset from the first local oscillator to provide a desired Doppler shift in the conditioned signal.

15. The system of claim 11 further comprising:

a RTS alignment fixture attached to the RTS and having a having a narrow slot;

a reflective material positioned on the RTS alignment fixture so that a laser beam when aligned approximately perpendicular to the automobile wheel axle when projected through the slot and reflected from the reflective material will position the RTS along the thrust vector of the vehicle.

16. An automobile collision avoidance radar antenna alignment system comprising:

a laser beam positioning fixture for positioning a laser beam perpendicular to a wheel axis of the automobile containing the collision avoidance radar;

a radar test system (RTS) for receiving a signal from the antenna of the collision avoidance radar system; and a RTS alignment fixture having a reflective material positioned so that when the laser beam is reflected from the reflective material, the RTS will be positioned along a thrust vector of the automobile.

17. The system of claim 16, wherein the RTS alignment fixture includes a narrow slot positioned so that the RTS will be positioned along the thrust vector of the automobile when the laser beam passes through the narrow slot and is reflected from the reflective material.

* * * * *